(12) United States Patent
Oyamada et al.

(10) Patent No.: US 8,541,086 B2
(45) Date of Patent: Sep. 24, 2013

(54) OPTICAL INFORMATION RECORDING MEDIUM AND METHOD FOR MANUFACTURING THE SAME

(75) Inventors: Mitsuaki Oyamada, Kanagawa (JP); Norihiro Tanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 261 days.

(21) Appl. No.: 12/521,612

(22) PCT Filed: Oct. 22, 2008

(86) PCT No.: PCT/JP2008/069110
§ 371 (c)(1), (2), (4) Date: Oct. 28, 2010

(87) PCT Pub. No.: WO2009/057492
PCT Pub. Date: May 7, 2009

(65) Prior Publication Data
US 2011/0044156 A1     Feb. 24, 2011

(30) Foreign Application Priority Data
Nov. 1, 2007 (JP) ................................ 2007-285218

(51) Int. Cl.
*G11B 7/24* (2013.01)
(52) U.S. Cl.
USPC ... 428/64.1; 428/64.4; 428/64.8; 430/270.14; 430/321

(58) Field of Classification Search
USPC ......................................... 428/64.4; 430/321
See application file for complete search history.

(56) References Cited

U.S. PATENT DOCUMENTS
4,894,313 A * 1/1990 Neumann et al. .......... 430/271.1

FOREIGN PATENT DOCUMENTS

| | | |
|---|---|---|
| JP | 2006-107606 | 4/2006 |
| JP | 2007-199092 | 8/2007 |
| JP | 2008-135144 | 6/2008 |
| JP | 2008-176902 | 7/2008 |

OTHER PUBLICATIONS
International Search Report corresponding to PCT/JP08/069110 dated Dec. 22, 2008.

* cited by examiner

*Primary Examiner* — Elizabeth Mulvaney
(74) *Attorney, Agent, or Firm* — Dentons US LLP (57) ABSTRACT

An optical information recording medium including a recording layer that can record a large amount of information is manufactured using a simple system. A single recording layer is formed by bonding two optically transparent substrates on which the first photosensitive polymer and the second photosensitive polymer are spread such that the layers of the photosensitive polymers face each other. Furthermore, since the absorptivity of light in the recording layer increases as the focal point of light for information recording moves in a depth direction, information can be recorded without decreasing the recording transfer rate of the information.

10 Claims, 6 Drawing Sheets

|  | MEDIUM A | MEDIUM B | MEDIUM C | COMPARATIVE MEDIUM |
|---|---|---|---|---|
| FIRST PHOTOSENSITIVE POLYMER LAYER | 0.02 | 0.03 | 0.02 | 0.10 |
| SECOND PHOTOSENSITIVE POLYMER LAYER | 0.10 | 0.12 | 0.11 | 0.10 |

FIG. 6

OPTICAL INFORMATION RECORDING MEDIUM AND METHOD FOR MANUFACTURING THE SAME

TECHNICAL FIELD

The present invention relates to an optical information recording medium and a method for manufacturing the optical information recording medium. In particular, the present invention relates to a technology regarding an optical information recording medium to be manufactured in which the absorptivity of light for information recording increases in proportion to the depth of a position in a recording layer from the incident side.

BACKGROUND ART

Examples of optical discs serving as optical information recording media include compact discs (CDs), digital versatile discs (DVDs), Blu-ray discs (BDs) (registered trademark), and the like. The recording density of these optical discs has been gradually becoming higher. In recent years, an optical information recording medium that can record a large amount of information has been required as the volume of information increases.

Volumetric recording in which information is recorded in the depth direction of a recording layer of an optical information recording medium is used as a method for recording a large amount of information on an optical information recording medium. Representative volumetric recording formats are a multilayer optical disc, volumetric recording that uses two-photon absorption, volumetric hologram recording, and the like (Japanese Unexamined Patent Application Publication No. 2005-100606).

However, for example, in the case of a multilayer optical disc, although it is important that recording layers composed of a resin into which signal pits are transferred from a metal stamper and a reflective film be precisely stacked, these steps are extremely complicated and a significant cost increase cannot be avoided due to a low yield.

Furthermore, in the case of volumetric recording that uses two-photon absorption, since the development of a highly stable recording medium and a high-power laser such as a femto-second laser are required, the cost of the entire system increases.

Moreover, in the case of volumetric hologram recording, a decrease in an S/N ratio with increasing medium noise caused by conducting multiplex recording, the difficult handling of a photopolymer medium, the necessity of a spatial modulator with many pixels and an image sensor, and the like increase the cost of the entire system.

As described above, all of these volumetric recording methods are disadvantageous for realizing practical use because a system for manufacturing an optical information recording medium is complicated and the cost of the entire system increases.

Accordingly, an object of the present invention is to manufacture an optical information recording medium having a recording layer that can record a large amount of information, using a simple system.

DISCLOSURE OF INVENTION

An optical information recording medium of the present invention includes a recording layer composed of a photosensitive polymer to be cured by irradiation with light having a certain wavelength, in which the photosensitive polymer is to be modified due to a temperature rise near a focal position caused by irradiation with light for information recording to form a recording mark, and a readout of the recording mark is to be conducted by irradiation with light for information reading using a difference in reflectivity of the light for information reading. In the recording layer, an absorptivity of the light for information recording increases in proportion to a depth from a side to which the light for information recording is incident.

Furthermore, the recording layer contains an organic metal compound.

Moreover, the recording layer contains an organic coloring matter.

A method for manufacturing an optical information recording medium of the present invention includes a first spreading step of dropping and spreading a first photosensitive polymer on a first optically transparent substrate; a second spreading step of dropping and spreading a second photosensitive polymer on a second optically transparent substrate; a recording layer formation step of forming a recording layer by bonding the first optically transparent substrate on which the first photosensitive polymer is spread in the first spreading step and the second optically transparent substrate on which the second photosensitive polymer is spread in the second spreading step such that surfaces on which the photosensitive polymers are spread face each other; a concentration diffusion awaiting step of awaiting concentration diffusion that occurs at an interface between the first photosensitive polymer and the second photosensitive polymer bonded in the recording layer formation step such that an absorptivity of light for information recording increases in proportion to a depth from a side to which the light for information recording is incident; and a recording layer curing step of curing the recording layer in which the concentration diffusion has occurred in the concentration diffusion awaiting step.

Accordingly, in the present invention, since the absorptivity of light for information recording increases in proportion to the depth from the side to which the light for information recording is incident, information can be recorded under substantially the same conditions both at a shallow position in the recording layer from the side to which the light for information recording is incident and at a deep position in a depth direction.

In the present invention, since the absorptivity of light for information recording in the recording layer increases in proportion to the depth from the side to which the light for information recording is incident, an optical information recording medium for volumetric recording that can record information without decreasing the recording transfer rate of the information even if the light for information recording is condensed at a shallow position in the recording layer from the side to which the light for information recording is incident or at a deep position in a depth direction can be provided.

In addition, since the recording layer of the optical information recording medium according to the present invention is made by bonding two photosensitive polymers spread on two optically transparent substrates, an optical information recording medium can be easily manufactured without using a complicated system.

BEST MODE FOR CARRYING OUT THE INVENTION

An optical information recording medium according to an embodiment of the present invention will be described hereinafter.

The optical information recording medium of this embodiment includes a recording layer composed of a photosensitive polymer having a photopolymerizable property or a photocrosslinking property, or both properties, and, by irradiating the recording layer with light having a wavelength that causes a photopolymerization reaction or a photocrosslinking reaction, or both the reactions, the cured photosensitive polymer is modified to form a recording mark.

In addition, when the recording layer is irradiated with light having a wavelength for recording information, the optical information recording medium has a recording transfer rate of information that does not decrease even if the light for information recording is condensed at a shallow position in the recording layer from the side to which the light for information recording is incident or at a deep position in a depth direction.

First, the steps of manufacturing such an optical information recording medium of this embodiment will be described with reference to FIGS. 1 and 2.

Figure 1:
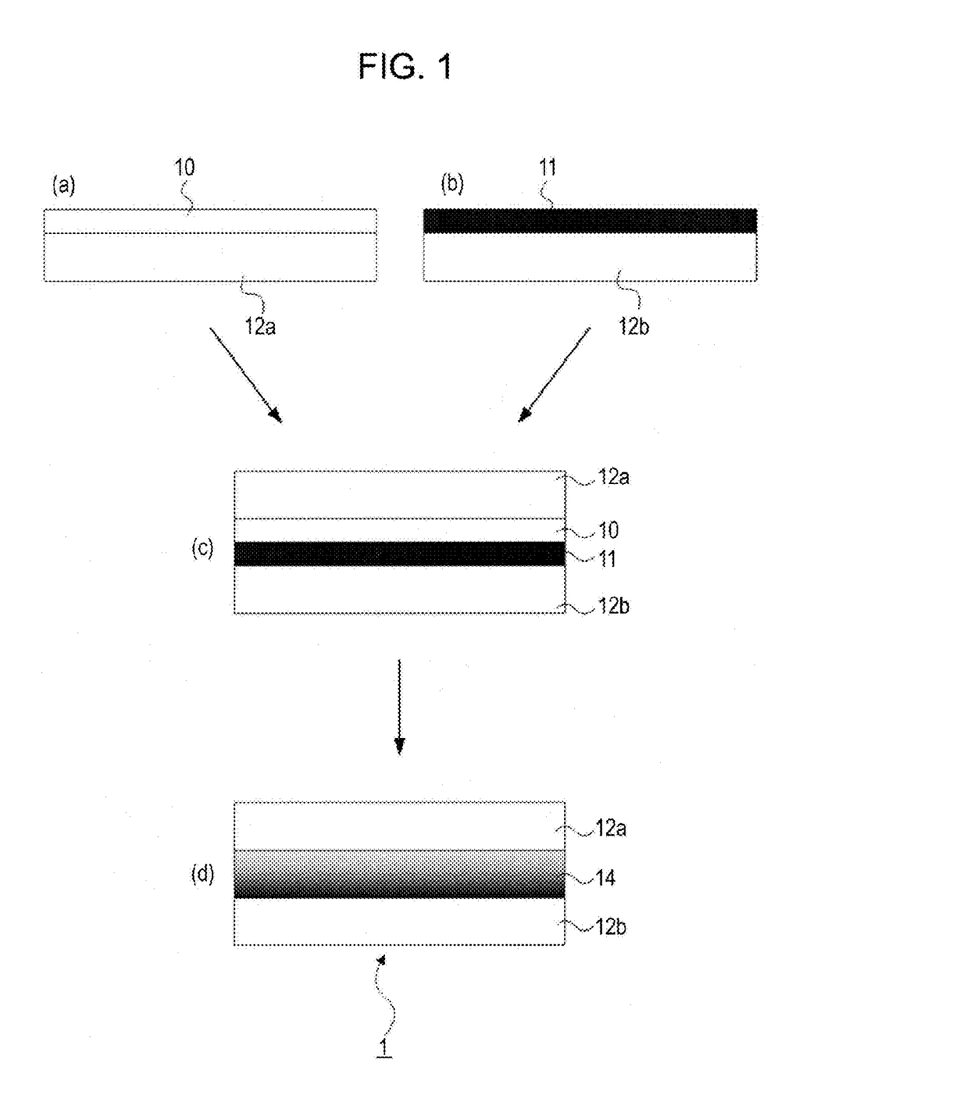
FIG. 1 is a view describing manufacturing steps of an optical information recording medium of this embodiment.
Figure 2:
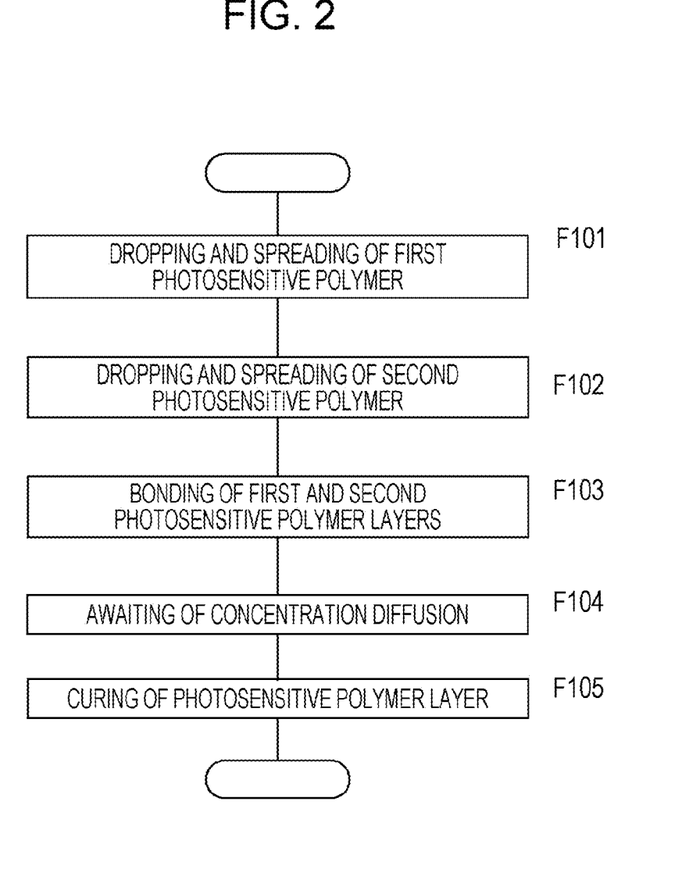
FIG. 2 is a flowchart describing the manufacturing steps of the optical information recording medium of this embodiment.

FIG. 1 schematically shows steps of manufacturing an optical information recording medium 1 of this embodiment, and FIG. 2 shows the steps of manufacturing the optical information recording medium 1 using a flowchart.

In manufacturing of the optical information recording medium 1, a first photosensitive polymer 10 is dropped and spread as shown in step F101 of FIG. 2. In other words, as shown in FIG. 1(a), the first photosensitive polymer 10 is spread on one surface of an optically transparent substrate 12a to form a first photosensitive polymer 10 layer on the optically transparent substrate 12a.

Next, a second photosensitive polymer 11 is dropped and spread as shown in step F102 of FIG. 2. In other words, as shown in FIG. 1(b), the second photosensitive polymer 11 is spread on one surface of an optically transparent substrate 12b to form the second photosensitive polymer 11 layer on the optically transparent substrate 12b. Furthermore, a photosensitive polymer having better light-absorbency of light for information recording than the first photosensitive polymer 10 is used as the second photosensitive polymer 11.

Subsequently, after the first photosensitive polymer 10 layer and the second photosensitive polymer 11 layer are respectively formed on the optically transparent substrates 12a and 12b as described above, the first photosensitive polymer 10 layer and the second photosensitive polymer 11 layer are bonded together as shown in step F103 of FIG. 2. That is to say, as shown in FIG. 1(c), the optically transparent substrates 12a and 12b are bonded together such that the first photosensitive polymer 10 layer and the second photosensitive polymer 11 layer are stacked one on top of the other, to form a single optical information recording medium 1.

In addition, concentration diffusion is awaited as shown in step F104 of FIG. 2. In other words, as shown in FIG. 1(c) described above, the first photosensitive polymer 10 layer and the second photosensitive polymer 11 layer are bonded together and left still for a certain period of time (several minutes to several tens of minutes), whereby concentration diffusion occurs at an interface between the bonded photosensitive polymers to create a concentration gradient. FIG. 1(d) shows a recording layer 14 composed of the first photosensitive polymer 10 and the second photosensitive polymer 11 in which a concentration gradient has been created. In the recording layer 14 shown in FIG. 1(d), for example, when light for information recording enters from the optically transparent substrate 12a side, the absorptivity of the light for information recording increases in proportion to the depth of a position in the recording layer 14.

Subsequently, the photosensitive polymer layers are cured as shown in step F105 of FIG. 2. That is to say, the photosensitive polymer is cured by irradiating the recording layer 14 composed of the first photosensitive polymer 10 and the second photosensitive polymer 11 in which a concentration gradient has been created, with light from a high-pressure mercury lamp (cumulative power 2500 mJ/cm$^2$). The thickness of the thus-cured recording layer 14 is, for example, about 300 μm.

Here, a photosensitive polymer having a photopolymerizable property or a photocrosslinking property, or both properties is used for the first photosensitive polymer 10 and the second photosensitive polymer 11 described above. For example, the photosensitive polymer is obtained by mixing, in a proper ratio, an oligomer for radical polymerization such as epoxy acrylate, urethane acrylate, polyester acrylate, polyether acrylate, copolymerized acrylate, polybutadiene acrylate, or silicon acrylate with a monomer of monofunctional acrylate or polyfunctional acrylate, and then by adding a benzophenone-based, acetophenone-based, benzoin-based, thioxanthone-based, or phosphine oxide-based polymerization initiator or the like for radical polymerization.

Alternatively, the photosensitive polymer is obtained by mixing, in a proper ratio, an oligomer for cationic polymerization such as an alicyclic epoxy resin, a glycidyl ether-type epoxy resin, a polyfunctional oxetane compound, or polyester vinyl ether with a monomer of an epoxy compound, an oxetane compound, or vinyl ethers, and then by adding a polymerization initiator for cationic polymerization such as a sulfonium salt, an iodonium salt, or the like.

Moreover, the degree of the photocrosslinkage of the photosensitive polymer used for the recording layer 14 described above can be changed by, for example, changing the amount of a polyfunctional acrylate monomer in radical polymerization. The sensitivity to the wavelength of a light source can also be adjusted by properly selecting a photopolymerization initiator.

Furthermore, an organic metal compound or an organic coloring matter that exhibits absorbency of light having a wavelength for information recording is dissolved in the photosensitive polymer used for the recording layer 14. Examples of the organic metal compound to be contained include porphyrin-based, phthalocyanine-based, and naphthalocyanine-based compounds. In addition, examples of the organic coloring matter include cyanine-based, merocyanine-based, styryl-based, and azo-based compounds. Then, the organic metal compound and organic coloring matter to be contained are properly selected in accordance with the light to be used having a wavelength for information recording.

Note that, regarding the first photosensitive polymer 10 and the second photosensitive polymer 11 described above, the same oligomer, the same monomer, and the same ratio thereof are preferred in view of achieving uniform diffusion conditions. In addition, the organic coloring matter and organic metal compound to be contained in the first photosensitive polymer 10 and the second photosensitive polymer 11 may be the same or different.

The optical information recording medium 1 of this embodiment that has been described so far includes the recording layer 14 that is composed of the first photosensitive polymer 10 and the second photosensitive polymer 11 having a photopolymerizable property or a photocrosslinking property, or both properties. In the recording layer 14, the photosensitive polymer is modified due to a temperature rise near the focal position caused by irradiation with light for information recording, to form a recording mark. Then, in the case where the recording layer 14 is irradiated with light for information reading, the readout of the recording mark is conducted using the difference in reflectivity of the light for information reading.

Furthermore, in the recording layer 14, the absorptivity of light for information recording increases in proportion to the depth of a position in the recording layer 14 from the side to which the light for information recording is incident.

Moreover, an organic metal compound or an organic coloring matter that exhibits absorbency of light having a wavelength for information recording is dissolved in the first photosensitive polymer 10 and the second photosensitive polymer 11 that form the recording layer 14.

Recording of information on the optical information recording medium 1 or reading of recorded information will be described.

Figure 3:
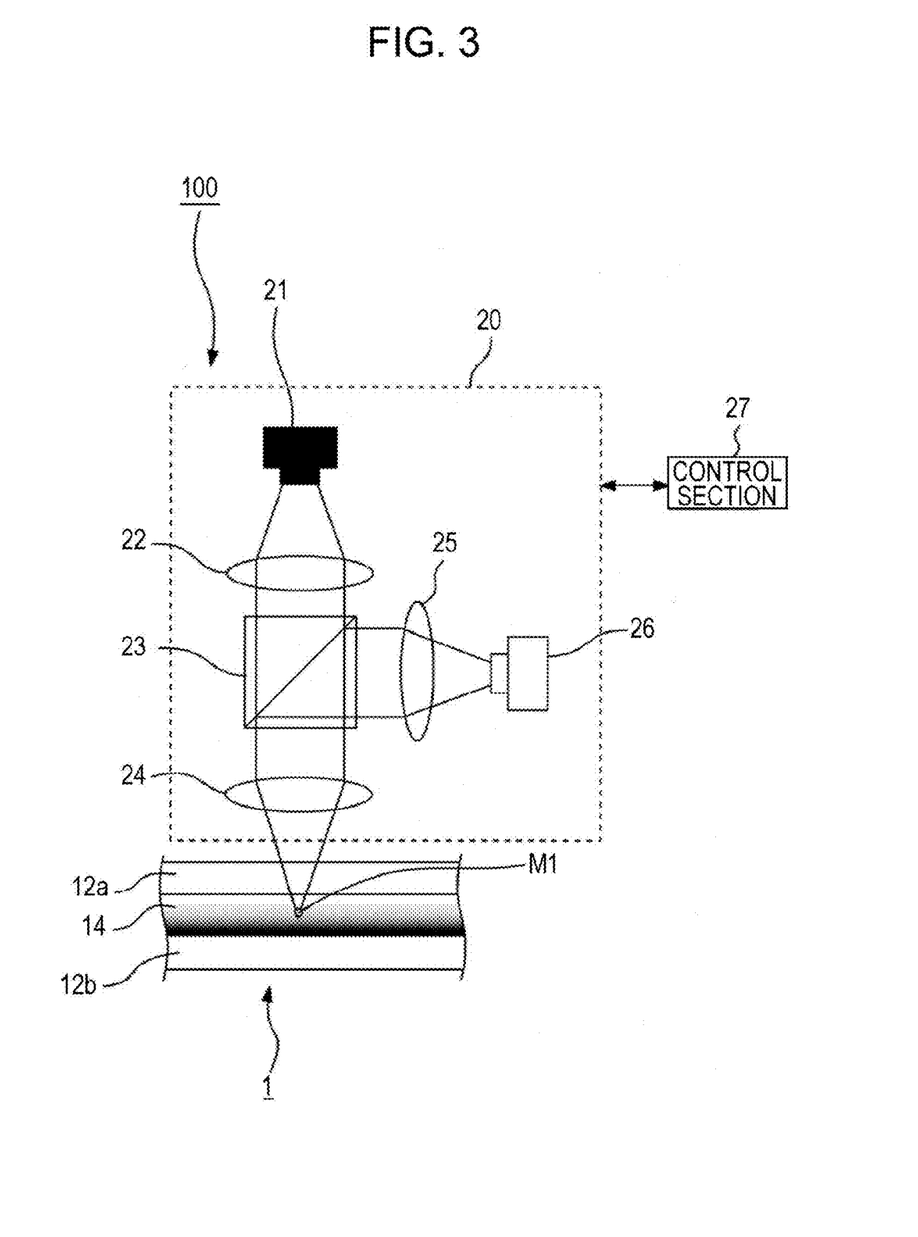
FIG. 3 is a view showing structures of the optical information recording medium and an optical information recording/reading apparatus of this embodiment.

An optical information recording/reading apparatus 100 shown in FIG. 3 is configured to conduct recording/reading of information by irradiating the optical information recording medium 1 with light.

To record information on the optical information recording medium 1, the recording layer 14 of the optical information recording medium 1 shown in FIG. 1 is irradiated with laser beams for information recording. Thus, the information can be recorded by modifying the photosensitive polymer of the recording layer 14 to form a recording mark.

On the other hand, to read the information recorded in the optical information recording medium 1, the recording mark formed on the recording layer 14 is irradiated with laser beams for information reading such that the laser beams are focused on the recording mark. Thus, the information is read by receiving the reflected light and transmitting information for reading to an information reading system not shown in FIG. 3.

The entire optical information recording/reading apparatus 100 is controlled by, for example, a control section 27 constituted by a microcomputer.

An optical pickup 20 is configured to irradiate the optical information recording medium 1 with light on the basis of the control of the control section 27, and to also receive light that returns from the optical information recording medium 1.

When the optical information recording/reading apparatus 100 records information on the optical information recording medium 1, the optical pickup 20 applies light for information recording constituted by, for example, a semiconductor laser having an optical power of 50 mW and a wavelength of 402 nm from a recording/reading laser 21 on the basis of the control of the control section 27. The applied light for information recording is converted to parallel light by a collimator lens 22, passes through a beam splitter 23, and is condensed by an objective lens 24 (e.g., NA=0.5). The photosensitive polymer that is cured due to a temperature rise at the focal position in the recording layer 14 of the optical information recording medium 1 is modified to form a recording mark M1.

The light for information recording in this case is the light having a wavelength that causes a photopolymerization reaction or a photocrosslinking reaction or both the reactions. In addition, the recording/reading laser 21 should be able to generate light at a high output as with a solid laser.

On the other hand, when the optical information recording/reading apparatus 100 reads the information recorded in the optical information recording medium 1, the optical pickup 20 applies light for information reading constituted by, for example, a semiconductor laser having an optical power of 0.5 mW and a wavelength of 402 nm from the recording/reading laser 21 on the basis of the control of the control section 27. The applied light for information reading is converted to parallel light by the collimator lens 22, passes through the beam splitter 23, is condensed by the objective lens 24, and reaches the recording layer 14 of the optical information recording medium 1. The light that returns from the recording layer 14 by reflection then passes through the objective lens 24 (e.g., NA=0.5) and the beam splitter 23, travels from a condenser lens 25 to a light-receiving element 26, and is detected as a signal according to the amount of reflected light from the recording mark M1.

Figure 4:
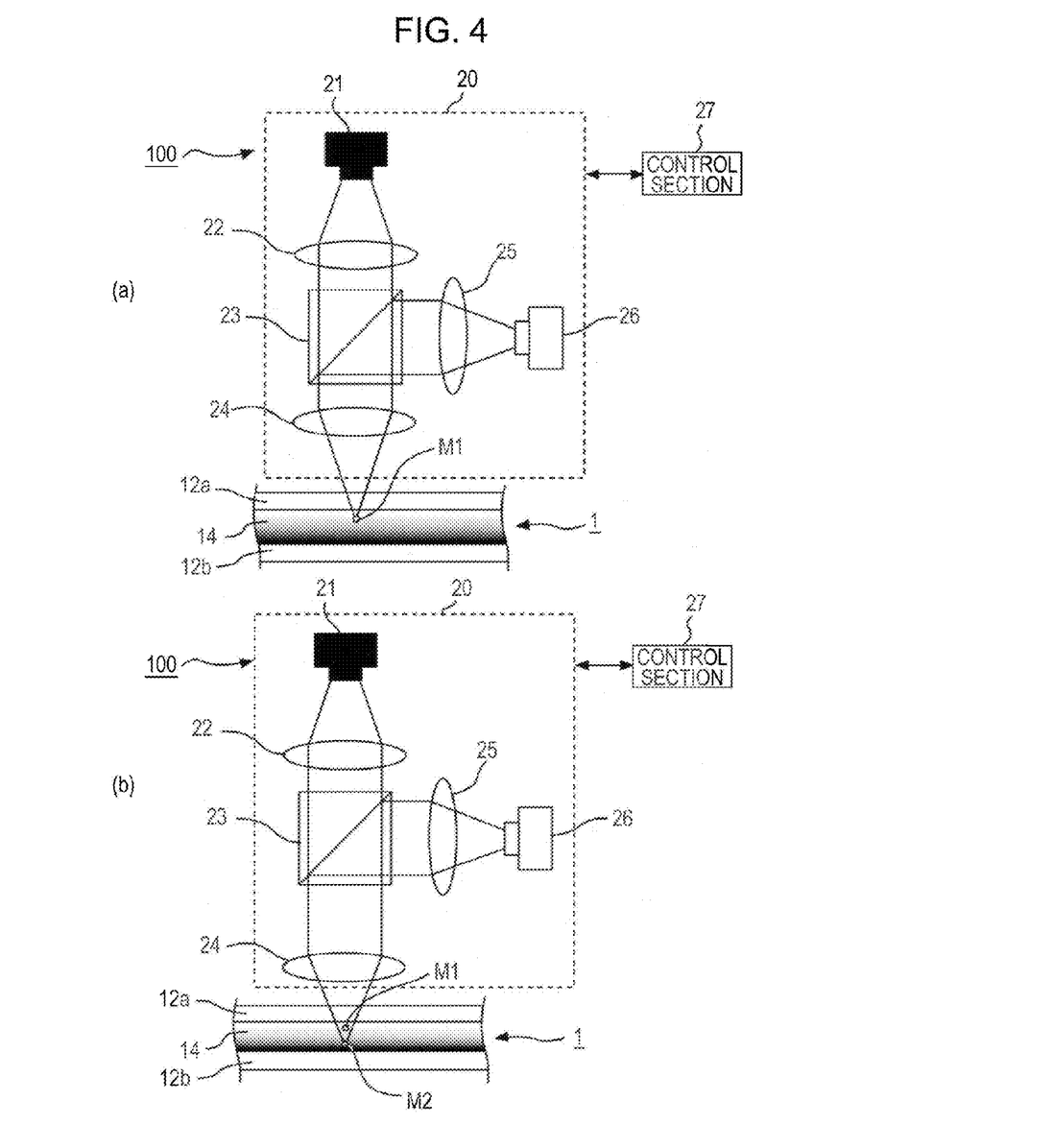
FIG. 4 is a view showing that the optical information recording/reading apparatus of this embodiment irradiates the optical information recording medium with a semiconductor laser for recording and reading.

FIG. 4 shows that the focal position of a semiconductor laser applied from the recording/reading laser 21 is changed in the depth direction of the recording layer 14 by moving the objective lens in an optical axis direction, when the optical information recording/reading apparatus 100 records information on the optical information recording medium 1 or reads the information recorded in the optical information recording medium 1.

FIG. 4(*a*) is a view showing that the focal position of a semiconductor laser in the recording layer 14 is at a shallow position from the incident side. FIG. 4(*a*) shows that the focal position of a semiconductor laser applied from the recording/reading laser 21 is moved to a shallow position in the recording layer 14 from the side to which the semiconductor laser is incident, by moving the position of the objective lens 24 in an optical axis direction so as to be withdrawn from the optical information recording medium 1. Then, for example, when the optical information recording/reading apparatus 100 tries to record information in the recording layer 14, a recording mark M1 is formed at the focal position of the semiconductor laser as shown in the drawing.

On the other hand, FIG. 4(*b*) is a view showing that the focal position of a semiconductor laser in the recording layer 14 is at a deep position from the incident side. FIG. 4(*b*) shows that the focal position of a semiconductor laser applied from the recording/reading laser 21 is moved to a deep position of the recording layer 14 from the side to which the semiconductor laser is incident, by moving the position of the objective lens 24 in an optical axis direction so as to approach the optical information recording medium 1. Then, for example, when the optical information recording/reading apparatus 100 tries to record information in the recording layer 14, a recording mark M2 is formed at the focal position of the semiconductor laser as shown in the drawing.

That is to say, the optical information recording/reading apparatus 100 includes a focusing mechanism with which the focal position of a semiconductor laser can be moved in a depth direction from the semiconductor-laser incident side of the recording layer 14 included in the optical information recording medium 1, by moving the objective lens 24 in an optical axis direction so as to be withdrawn from or approach the optical information recording medium 1.

The optical information recording medium 1 of this embodiment that has been described so far is manufactured by bonding the first photosensitive polymer 10 and the second photosensitive polymer 11 together to form a single recording layer 14. The photosensitive polymer for forming the recording layer 14 should have a photopolymerizable property or a photocrosslinking property, or both properties, and the optical information recording medium 1 is manufactured using the photosensitive polymer having such properties.

Then, manufacturing of the optical information recording medium 1 using the photosensitive polymer having such properties will be described hereinafter, taking a medium A, a medium B, and a medium C as examples.

First, to manufacture the optical information recording medium 1 as a medium A, bis(η-2,4-cyclopentadien-1-yl)-bis(2,6-difluoro-3-(1H-pyrrol-1-yl)-phenyl)titanium (hereinafter referred to as Irg-784), which is an organic metal compound, is mixed with a radically polymerizable ultraviolet-curable resin such that the ratio of Irg-784 to the ultraviolet-curable resin is 1% on a weight basis, and is then stirred to produce the first photosensitive polymer 10. The first photosensitive polymer 10 is spread on one surface of the optically transparent substrate 12a, for example, made of glass and having a thickness of 1 mm to form a first photosensitive polymer 10 layer on the optically transparent substrate 12a.

Subsequently, Irg-784, which is an organic metal compound, is mixed with the radically polymerizable ultraviolet-curable resin that is the same one used to produce the first photosensitive polymer 10 such that the ratio of Irg-784 to the ultraviolet-curable resin is 5% on a weight basis, and is then stirred to produce the second photosensitive polymer 11. The thus-produced second photosensitive polymer 11 can be a photosensitive polymer having better absorbency of light for information recording than the first photosensitive polymer 10. Then, the resultant second photosensitive polymer 11 is spread on one surface of the optically transparent substrate 12b, for example, made of glass and having a thickness of 1 mm to form the second photosensitive polymer 11 layer on the optically transparent substrate 12b. Then, the first photosensitive polymer 10 layer and the second photosensitive polymer 11 layer respectively formed on the two optically transparent substrates 12a and 12b are bonded together so as to be stacked one on top of the other, to form the recording layer 14. Consequently, the medium A as the optical information recording medium 1 can be manufactured.

Next, to manufacture the optical information recording medium 1 as a medium B, (5,10,15,20-tetraphenyl-21H,23H-porphine copper(II) hereinafter referred to as Cu-TPP), which is an organic metal compound, is mixed with a radically polymerizable ultraviolet-curable resin such that the ratio of Cu-TPP to the ultraviolet-curable resin is 0.1% on a weight basis, and is then stirred to produce the first photosensitive polymer 10. The first photosensitive polymer 10 is spread on one surface of the optically transparent substrate 12a, for example, made of glass and having a thickness of 1 mm to form a first photosensitive polymer 10 layer on the optically transparent substrate 12a.

In addition, Cu-TPP, which is an organic metal compound, is mixed with the radically polymerizable ultraviolet-curable resin that is the same one used to produce the first photosensitive polymer 10 such that the ratio of Cu-TPP to the ultraviolet-curable resin is 0.5% on a weight basis, and is then stirred to produce the second photosensitive polymer 11. The thus-produced second photosensitive polymer 11 can be a photosensitive polymer having better absorbency of light for information recording than the first photosensitive polymer 10. Then, the resultant second photosensitive polymer 11 is spread on one surface of the optically transparent substrate 12b, for example, made of glass and having a thickness of 1 mm to form a second photosensitive polymer 11 layer on the optically transparent substrate 12b.

Then, the first photosensitive polymer 10 layer and the second photosensitive polymer 11 layer respectively formed on the two optically transparent substrates 12a and 12b are bonded together so as to be stacked one on top of the other, to form the recording layer 14. Consequently, the medium B as the optical information recording medium 1 can be manufactured.

Furthermore, to manufacture the optical information recording medium 1 as a medium C, Disperse Yellow 7, which is an organic coloring matter, is mixed with a radically polymerizable ultraviolet-curable resin such that the ratio of Disperse Yellow 7 to the ultraviolet-curable resin is 0.1% on a weight basis, and is then stirred to produce the first photosensitive polymer 10. The first photosensitive polymer 10 is spread on one surface of the optically transparent substrate 12a, for example, made of glass and having a thickness of 1 mm to form a first photosensitive polymer 10 layer on the optically transparent substrate 12a.

In addition, Disperse Yellow 7, which is an organic coloring matter, is mixed with the radically polymerizable ultraviolet-curable resin that is the same one used to produce the first photosensitive polymer 10 such that the ratio of Disperse Yellow 7 to the ultraviolet-curable resin is 0.5% on a weight basis, and is then stirred to produce the second photosensitive polymer 11. The thus-produced second photosensitive polymer 11 can be a photosensitive polymer having better absorbency of light for information recording than the first photosensitive polymer 10. Then, the resultant second photosensitive polymer 11 is spread on one surface of the optically transparent substrate 12b, for example, made of glass and having a thickness of 1 mm to form a second photosensitive polymer 11 layer on the optically transparent substrate 12b.

Then, the first photosensitive polymer 10 layer and the second photosensitive polymer 11 layer respectively formed on the two optically transparent substrates 12a and 12b are bonded together so as to be stacked one on top of the other, to form the recording layer 14. Consequently, the medium C as the optical information recording medium 1 can be manufactured.

Any of the recording layers 14 of the medium A, medium B, and the medium C that have been described above has the concentration gradient shown in FIG. 1(d). This is because, in any medium, a polymer having better light-absorbency of light for information recording than the first photosensitive polymer 10 is used as the second photosensitive polymer 11.

Thus, when light for information recording enters the recording layer 14 of each of the media from the optical information recording/reading apparatus 100, information can be recorded by forming a recording mark on the recording layer 14 without decreasing the recording transfer rate of the information, even if the focal position of the light for information recording moves to a deeper position from the side to which the light for information recording is incident.

Here, an example of the optical information recording medium 1 including the recording layer 14 with the photosensitive polymers in which the first photosensitive polymer 10 and the second photosensitive polymer 11 have the same absorbency of light for information recording unlike the medium A, the medium B, and the medium C will be described as a comparative medium.

First, to manufacture the optical information recording medium 1 as a comparative medium, Irg-784, which is an organic metal compound, is mixed with a radically polymerizable ultraviolet-curable resin such that the ratio of Irg-784 to the ultraviolet-curable resin is 5% on a weight basis, and is then stirred to produce the first photosensitive polymer 10 and the second photosensitive polymer 11. Then, the produced first photosensitive polymer 10 is spread on one surface of the optically transparent substrate 12a, for example, made of glass and having a thickness of 1 mm to form a first photosensitive polymer 10 layer on the optically transparent substrate 12a. Furthermore, the produced second photosensitive polymer 11 is spread on one surface of the optically transparent substrate 12b, for example, made of glass and having a thickness of 1 mm to form a second photosensitive polymer 11 layer on the optically transparent substrate 12b.

Then, the first photosensitive polymer 10 layer and the second photosensitive polymer 11 layer respectively formed on the two optically transparent substrates 12a and 12b are bonded together so as to be stacked one on top of the other, to form the recording layer 14. Consequently, the comparative medium as the optical information recording medium 1 can be manufactured.

In the recording layer 14 of the thus-manufactured comparative medium, the concentration gradient shown in FIG. 1(d) does not occur. In addition, when the recording layer 14 is irradiated with light for information recording from the optical information recording/reading apparatus 100, it takes more time to form a recording mark as the focal position of the light for information recording moves to a deeper position from the side to which the light for information recording is incident, which requires more time for recording information. Consequently, the recording transfer rate decreases. In other words, the optical information recording medium 1 including the recording layer 14 with the photosensitive polymers having the same absorbency of light for information recording cannot be used as the optical information recording medium 1 of the present invention.

Figure 5:
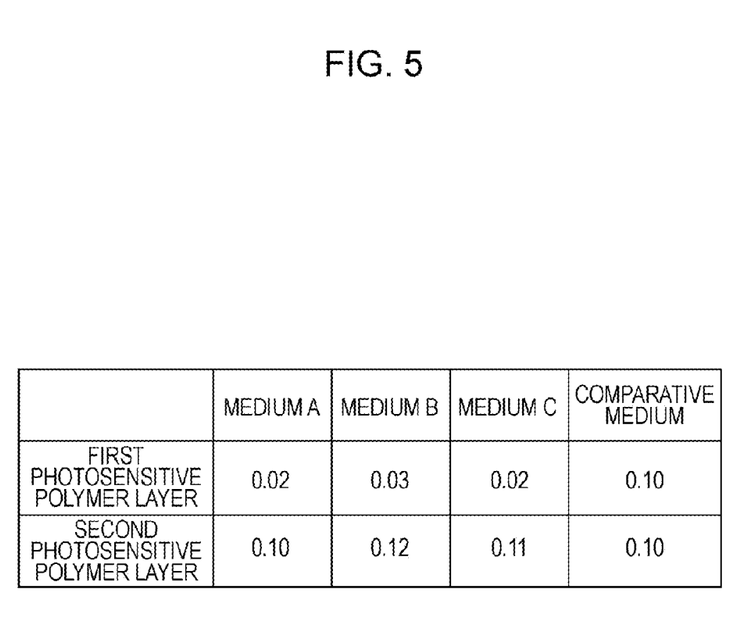
FIG. 5 is a table showing an absorption coefficient of each medium of this embodiment.

FIG. 5 is a table showing the absorption coefficients of the first photosensitive polymer 10 and the second photosensitive polymer 11 in the medium A, the medium B, the medium C, and the comparative medium.

In FIG. 5, the absorption coefficients of the first photosensitive polymer 10 and the second photosensitive polymer 11 in the medium A are 0.02 and 0.10, respectively, and the absorption coefficient of the second photosensitive polymer 11 is higher than that of the first photosensitive polymer 10.

Furthermore, in the case of the medium B, the absorption coefficients of the first photosensitive polymer 10 and the second photosensitive polymer 11 are 0.03 and 0.12, respectively, and the absorption coefficient of the second photosensitive polymer 11 is higher than that of the first photosensitive polymer 10.

Then, in the medium C, the absorption coefficients of the first photosensitive polymer 10 and the second photosensitive polymer 11 are 0.02 and 0.11, respectively, and the absorption coefficient of the second photosensitive polymer 11 is higher than that of the first photosensitive polymer 10.

However, in the case of the comparative medium, the absorption coefficients of the first photosensitive polymer 10 and the second photosensitive polymer 11 are 0.10 and 0.10, respectively, and the absorption coefficients of the first photosensitive polymer 10 and the second photosensitive polymer 11 are the same value.

In any of the medium A, the medium B, and the medium C, the absorption coefficient of the second photosensitive polymer 11 is higher than that of the first photosensitive polymer 10. In addition, the first photosensitive polymer 10 layer and the second photosensitive polymer 11 layer are bonded together, the layers having different absorption coefficients, and are then left still for a certain period of time, whereby concentration diffusion occurs at the interface and the recording layer 14 having a concentration gradient is formed.

That is to say, the absorptivity of light having a wavelength for information recording increases in proportion to the depth of a position in the recording layer 14 from the side to which the light for information recording is incident.

On the other hand, in the case of the comparative medium, since the absorption coefficients of the first photosensitive polymer 10 and the second photosensitive polymer 11 are the same value, concentration diffusion does not occur and the recording layer 14 having a concentration gradient is not formed. Therefore, the absorptivity of light having a wavelength for information recording at a shallow position from the side to which the light for information recording is incident is the same as that at a deep position in the depth direction of the recording layer 14.

Figure 6:
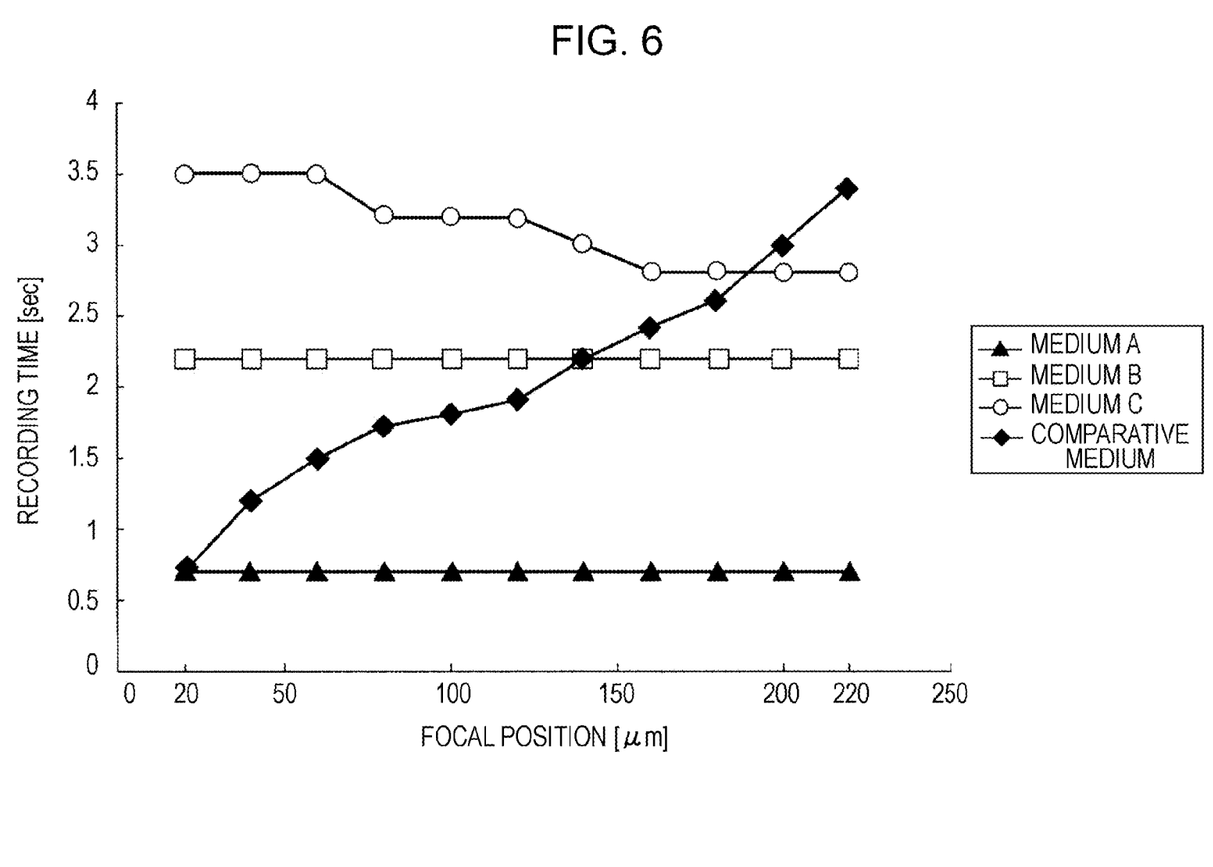
FIG. 6 is a graph showing a relationship between time required to form a recording mark in each medium of this embodiment and its focal position.

FIG. 6 is a view showing a relationship between the irradiation time of light for information recording and the position of a recording mark formed in the recording layer 14, when a recording mark is formed by entrance of light for information recording into the medium A, the medium B, the medium C, and the comparative medium and a signal strength that is detectable as a reading signal is obtained.

In FIG. 6, the irradiation time of light for information recording when a recording mark is formed by entrance of light for information recording from the optical information recording/reading apparatus 100 and a signal strength that is detectable as a reading signal is obtained is regarded as recording time. FIG. 6 shows the change of the recording time when the focal position is shifted by 20 μm from 20 to 220 μm in a depth direction.

In the case of the comparative medium, first, it is found from the following formula (Lambert's law: $I_0$=intensity of incident light, I=intensity of transmitted light, K=absorption coefficient, l=optical path length, T=transmittance) that the intensity of transmitted light decreases with increasing depth of a position in the recording layer 14 from the side to which light for information recording is incident. As a result, when recording is conducted at a deep position from the side to which light for information recording is incident, long irradiation of the light for information recording is required to provide a heat energy that is necessary to form a recording mark which is observable as a reflectivity change of light for information reading, which changes the recording transfer rate of information and decreases it.

$$I/I_0 = 10^{-Kl} = T$$

The graph of the comparative medium in FIG. 6 shows that the recording time increases in proportion to the depth of the focal position.

On the other hand, in the case of the medium A, the medium B, and the medium C, as shown in FIG. 5 described above, the recording layer 14 having a concentration gradient is formed by bonding the first photosensitive polymer 10 layer and the second photosensitive polymer 11 layer together, the layers having different absorption coefficients, and the absorptivity of light for information recording increases in proportion to the depth of a position in the recording layer 14.

Accordingly, when recording is conducted by forming a recording mark at a deep position from the side to which light for information recording is incident, the heat energy that is necessary to form a recording mark which is observable as a reflectivity change of light for information reading is substantially the same as when the recording is conducted by forming a recording mark at a shallow position from the incident side. Furthermore, since formation of the recording marks with substantially the same heat energy means that the irradiation time of the light for information recording is also substantially the same, the recording transfer rate of information hardly changes and decreases.

In any of the medium A, the medium B, and the medium C shown in FIG. 6, even if the recording is conducted by forming a recording mark at a deep position in the recording layer 14 or by forming a recording mark at a shallow position from the incident side, the recording time is substantially constant. Thus, any of the medium A, the medium B, and the medium C can be regarded as the optical information recording medium 1 whose recording transfer rate of information of the recording layer 14 hardly decreases.

As can be understood from the above description, the recording layer 14 included in the optical information recording medium 1 of this embodiment is formed using the second photosensitive polymer 11 having a higher absorption coefficient than the first photosensitive polymer 10, which creates a concentration gradient. In addition, the absorptivity of light increases as the light for information recording travels in a depth direction, that is, information can be recorded on the recording layer 14 without decreasing the recording transfer rate of information.

Moreover, the optical information recording medium 1 of this embodiment can be easily manufactured without using a complicated system because a recording layer that can record a large amount of information can be made by bonding two photosensitive polymers that have different absorption coefficients.

The embodiment has been described above, but the present invention is applicable without being limited to the examples described above.

The optical information recording medium 1 of this embodiment may be, for example, a circular optical disc or a card-type optical information recording medium.

What is claimed is:

1. An optical information recording medium comprising:
a recording layer composed of a photosensitive polymer operable to be cured by irradiation with light having a certain wavelength, the photosensitive polymer operable to be modified when temperature increases near a focal position caused by irradiation with light for information recording to form a recording mark, the recording mark operable to be readout by irradiation with light for information reading using a difference in reflectivity of the light for information reading,
wherein,
the recording layer has an organic coloring matter operable to diffuse to form a concentration gradient in the recording layer with an absorptivity of the light for information recording that increases in proportion to a depth from a side to which the light for information recording is incident.

2. The optical information recording medium according to claim 1 characterized in that the recording layer contains an organic metal compound.

3. A method for manufacturing an optical information recording medium, the method comprising the steps of:

dropping and spreading a first photosensitive polymer on a first optically transparent substrate in a first spreading step, the first photosensitive polymer containing a first organic coloring matter;
dropping and spreading a second photosensitive polymer on a second optically transparent substrate in a second spreading step, the second photosensitive polymer containing a second organic coloring matter;
forming a recording layer by bonding the first optically transparent substrate on which the first photosensitive polymer is spread in the first spreading step and the second optically transparent substrate on which the second photosensitive polymer is spread in the second spreading step such that surfaces on which the photosensitive polymers are spread face each other in a recording layer formation step;
awaiting concentration diffusion of the first and second organic coloring matters that occurs at an interface between the first photosensitive polymer and the second photosensitive polymer bonded in the recording layer formation step such that an absorptivity of light for information recording increases in proportion to a depth from a side of the recording layer to which the light for information recording is incident to permit information to be recorded at shallow and deep positions in the recording layer at substantially equal conditions in a concentration diffusion awaiting step; and
curing the recording layer in which the concentration diffusion has occurred in the concentration diffusion awaiting step.

4. The optical information recording medium according to claim 1, wherein the organic coloring matter is a cyanine-based compound, a merocyanine-based compound, a styryl-based compound, or an azo-based compound.

5. The optical information recording medium according to claim 1, wherein the recording layer includes a first photosensitive polymer layer and a second photosensitive polymer layer bonded together, the second photosensitive polymer layer having a higher absorption coefficient than an absorption coefficient of the first photosensitive polymer layer.

6. The method for manufacturing the optical information recording medium according to claim 3, wherein an absorption coefficient of the second photosensitive polymer layer is higher than an absorption coefficient of the first photosensitive polymer layer.

7. The method for manufacturing the optical information recording medium according to claim 3, wherein the first and second organic coloring matters exhibit the absorptivity of light for information recording.

8. The method for manufacturing the optical information recording medium according to claim 7, wherein the first organic coloring matter contained within the first photosensitive polymer and the second organic coloring matter contained within the second photosensitive polymer are the same.

9. The method for manufacturing the optical information recording medium according to claim 7, wherein the first organic coloring matter contained within the first photosensitive polymer and the second organic coloring matter contained within the second photosensitive polymer are different.

10. The method for manufacturing the optical information recording medium according to claim 8, wherein the first organic coloring matter contained within the first photosensitive polymer and the second organic coloring matter contained within the second photosensitive polymer are a cyanine-based compound, a merocyanine-based compound, a styryl-based compound, or an azo-based compound.

* * * * *